Oct. 27, 1925.
F. MILLIKEN
1,558,905
STREET SIGNAL LAMP
Filed Dec. 17, 1920    2 Sheets-Sheet 1
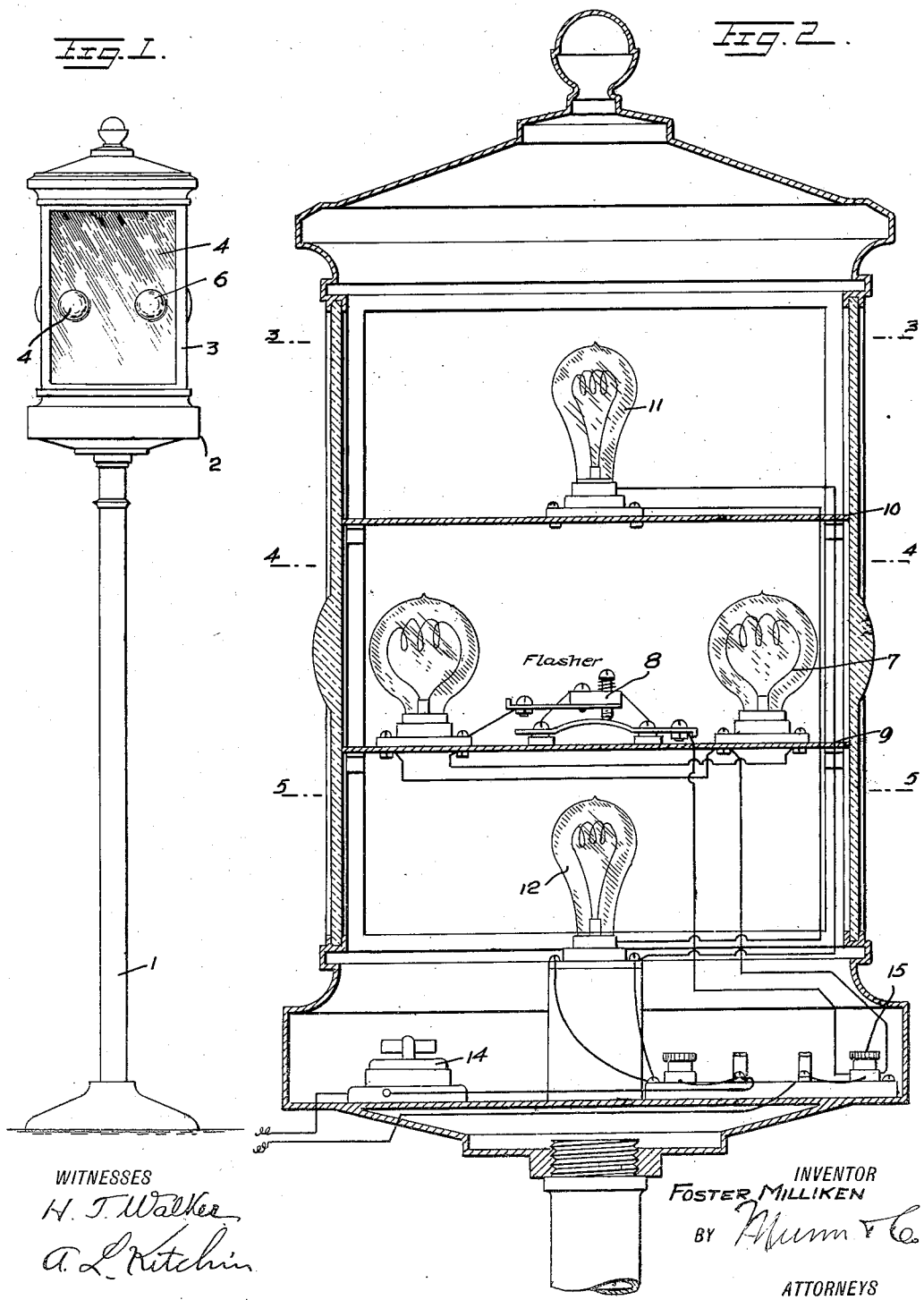
WITNESSES
H. J. Walker
A. L. Kitchin
INVENTOR
FOSTER MILLIKEN
BY Munn & Co.
ATTORNEYS Oct. 27, 1925.  1,558,905

F. MILLIKEN

STREET SIGNAL LAMP

Filed Dec. 17, 1920  2 Sheets-Sheet 2

WITNESSES
H. J. Walker
A. L. Kitchin

INVENTOR
FOSTER MILLIKEN
BY Munn & Co.
ATTORNEYS

Patented Oct. 27, 1925.

1,558,905

UNITED STATES PATENT OFFICE.

FOSTER MILLIKEN, OF LAWRENCE, NEW YORK.

STREET SIGNAL LAMP.

Application filed December 17, 1920. Serial No. 431,408.

*To all whom it may concern:*

Be it known that I, FOSTER MILLIKEN, a citizen of the United States, and a resident of Lawrence, in the county of Nassau and State of New York, have invented a new and Improved Street Signal Lamp, of which the following is a full, clear, and exact description.

This invention relates to signal lamps and particularly to an improved lamp for use at the intersection of streets or other places and has for an object the provision of an improved structure wherein an illumination is provided and an automatic signal.

Another object of the invention is to provide a street signal light which will produce flashes of light intermittently and thereby attract the attention of persons passing the light.

A further object more specifically is to provide a combined street light and signal wherein illuminating members are provided and a series of lenses or bull's eyes associated with one or a plurality of lamps for producing rays of light capable of projection through the lenses so as to provide flashes of concentrated light.

An additional object is to provide a street light with lenses or bull's eyes on a plurality of sides and automatically flashing electric lamps for producing rays of light for the respective lenses at certain intervals in order to attract the attention of persons approaching the light.

In the accompanying drawings—

Figure 1 is a side view of the complete lamp ready for use, said lamp embodying the invention.

Figure 2 is a longitudinal vertical section through the lamp body shown in Figure 1.

Figure 3:
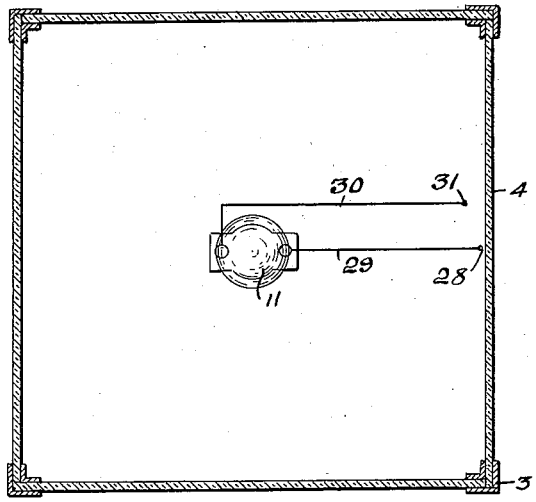
Figure 3 is a horizontal sectional view through Figure 2 on line 3—3.

Referring to the accompanying drawings by numeral, 1 indicates a standard of any desired kind which is secured to the frame 2 of the body 3 of the lamp. The body 3 is made up of suitable corner pieces and a top piece whereby four panes of glass 5 may be properly held in place. Preferably four are used because this is the usual number necessary for ordinary intersecting streets but it is evident that more or less number of sides could be provided without departing from the spirit of the invention. Formed integral with or secured in some manner to each pane of glass are lenses or bull's eyes 5 and 6, the bull's eyes on opposite panes being in line and also in line with certain of the electric lamps 7.

Figure 4:
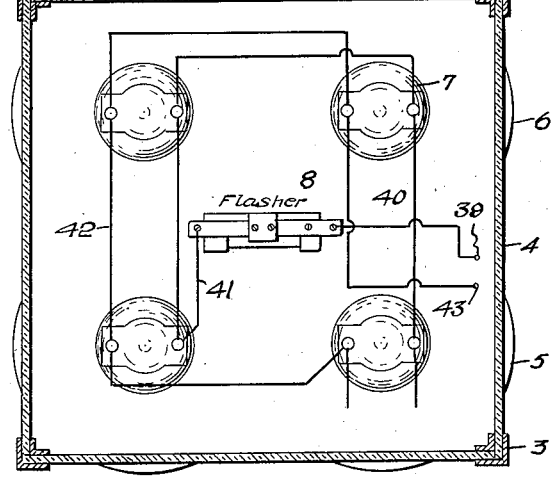
Figure 4 is a horizontal sectional view through Figure 2 on line 4—4.
Figure 5:
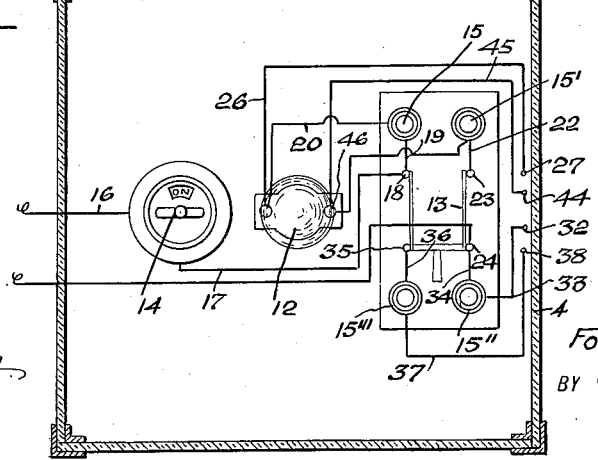
Figure 5 is a horizontal sectional view through Figure 2 on line 5—5.

In Figure 4, eight bull's eyes have been shown and four lamps arranged so that each lamp may project a gleam of light through two adjacent bull's eyes and thereby produce a strong centralized illumination. If desired, the panes of glass 4 may be ordinary clear glass while the bull's eyes are colored red or some other color in order to produce a striking appearance which will instantly attract the eye when illuminated. Arranged at a convenient point, preferably within the square form of the lamp 7, is a conventional flasher 8 which may be of any desired or improved type but which will automatically turn on and off the lamps at stated intervals. If desired, the flasher could merely dim the lights instead of turning them out.

In Figure 2 it will be seen that partitions 9 and 10 are provided, said partitions being of metal or some other suitable material, partition 9 acting as a support for the lamps 7 and the flasher 8 while an illuminating lamp 11 is supported by division plate 10 and the second illuminating lamp 12 supported in a suitable socket mounted on the base 2. The division plates 9 and 10 in addition to acting as supports as just specified also act as means for shutting off the light from lamps 11 and 12 from the space occupied by lamp 7. The lamps 11 and 12 may be colored or clear as desired and are designed to give a permanent illumination while the lamps 7 are designed to be intermittently flashed for giving signals which signals take the form of a very bright gleam of light projected through the various bull's eyes during the time that the lamps 7 are lighted. It will be observed that all of the lamps 7 are lighted simultaneously and, consequently, all the bull's eyes 5 and 6 will be illuminated simultaneously.

In order to provide proper connections for the various parts, switch 13 is provided and also a thumb or turn switch 14 for readily turning on and off the current at any time. Associated with the switch 13 are two pairs of fuses 15 with the wiring arranged so that the current for the various lamps are distributed to the different fuses. The various lamps 7 and also the lamps 11 and 12 may be connected up in several ways but preferably a simple wiring is used as shown in Figures 2, 3 and 4, said wiring utilizing one or more fuses for each lamp. In tracing the circuit of lamp 12, it may be assumed that current is taken from the lead-in-wire 16. When the switch 14 is turned on, current will pass from lead-in-wire 16 to wire 17, binding post 18, wire 19, fuse 15, wire 20, one side of lamp 12 and through said lamp to wire 21, through wire 21 to fuse 15', through said fuse to wire 22, binding post 23 and one of the arms of switch 13, binding post 24 and from thence to the return wire 25. It will be noted that in order to light lamp 12, both the switches 13 and 14 must be turned on.

In tracing the circuit of lamp 11, current passes from the lead-in-wire 16 through switch 14, wire 17, binding post 18, wire 19, fuse 15, wire 20, wire 26 to binding post 27 and from thence over wire 27', to binding post 28 and then over wire 29 to the lamp 11 and after passing through said lamp to wire 30, binding post 31 and then over wire 30' to binding post 32, wire 33, fuse 15", wire 34, binding post 24 and common return 25 back to the source. It will be noted that lamp 11 may be lighted by merely turning on switch 14 as the current for this lamp does not pass through switch 13.

In tracing the circuit of the lamps 7, it will be noted that they are connected up in multiple and are connected to the flasher 8 so that all of the current passing to these lamps must pass through the flasher 8. Starting with the lead-in-wire 16, current will pass through switch 14, wire 17, binding post 18, one of the arms of the switch 13, binding post 35, wire 36, fuse 15''', wire 37 to the binding post 38 and from thence over wire 38' to the binding post 39, wire 40 to the flasher 8. After the current passes through the flasher 8 it passes onto wire 41 connected to one side of all of the lamps 7 so that the current passing through said lamps will use the wire 42 as a common return, said common return wire being connected with the binding post 43 which in turn is connected by wire 43' to the binding post 44 and current will pass from said binding post over wire 45 to the binding post 46 of lamp 12, through wire 21, fuse 15', wire 22, binding post 23, one of the arms of switch 13, binding post 24 and wire 25 back to the source. It will be noted that the current to the lamps 7 passes through both the switches 13 and 14.

The present application is directed primarily to the arrangement of lamps and lenses in the middle portion of the device. The general arrangements, such as the division of the device into a plurality of chambers, with some of the lamps permanently lighted and some arranged to flash, which arrangements were originally claimed in this application, are now covered by my co-pending application Serial No. 538,304, filed February 21, 1922.

What I claim is:—

In a device of the type described, a substantially square casing, a pair of lenses in each wall of the casing, and four lamps in the casing positioned so that there is a lamp substantially at each intersection point of lines drawn between the axes of opposite lenses.

FOSTER MILLIKEN.